United States Patent Office 3,034,954
Patented May 15, 1962

3,034,954
VIRUS INHIBITORS
Walter A. Darlington, Dayton, Ohio, assignor to Monsanto Chemical Company, St. Louis, Mo., a corporation of Delaware
No Drawing. Filed Mar. 23, 1960, Ser. No. 16,962
6 Claims. (Cl. 167—33)

The invention relates to the inhibition of the growth of viruses which attack plants, and more particularly to chemotherapy as applied to the control of plant viruses.

Viruses have been defined as submicrscopic entities capable of being introduced into specific living cells and reproducing inside such cells only. This definition summarizes the chief characteristic of viruses—small size, infectivity, host specificity, and complete dependence on the integrity of the host cell. The intimate relationship between the virus and the host cell is the most distinguishing feature of the virus, and necessitates a more subtle approach to the chemotherapy of viruses than to that of other infectious agents, such as bacteria and fungi.

Viruses have long plagued mankind, but their existence was recognized first in 1892. It is now known that viruses afflict plants, insects, bacteria and animals, and seem to be increasing in importance. This invention is of course, limited to the treatment of virus diseases of plants.

It is an object of this invention to provide a chemical method of treating plants to inhibit the growth of viruses in the plants.

It is another object of this invention to provide a chemical method of treating tobacco plants to inhibit the growth of tobacco mosaic virus therein.

It is yet another object of this invention to provide compositions for the inhibition of virus growth.

These and other objects of the invention will become apparent as the detailed description of the invention proceeds.

The invention, which is directed to the inhibition of growth of plant viruses, involves treating the plants with at least a virus growth inhibiting amount of a chemical compound having the formula

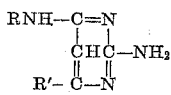

wherein R is a radical selected from the group consisting of saturated aliphatic hydrocarbyl radicals having from 6 to 20 carbon atoms, and aliphatic hydrocarbyl radicals containing olefinic unsaturation and having from 6 to 20 carbon atoms, and R' is selected from the group consisting of hydrogen and lower alkyl radicals having from 1 to 6 carbon atoms.

Aminopyrimidine compounds of the above formula having saturated aliphatic hydrocarbylamino radicals are the normal and branched chain alkyl and cycloalkyl-amino-substituted amino pyrimidines. Examples of such compounds are: 2-amino-4-hexylamino-6-methylpyrimidine, 2-amino-4-decylamino-6-ethylpyrimidine, 2-amino-4-dodecylaminopyrimidine, 2-amino-6-propyl-4-hexadecyl-aminopyrimidine, 2-amino-4-tetradecylaminopyrimidine, 2-amino-4-(2-ethylhexylamino) - 6 - methylpyrimidine, 2-amino-4-cyclohexylamino-6 - ethylpyrimidine, 2 - amino-4 - (4 - cyclohexylbutylamino) - 6 - hexylpyrimidine, and aminopyrimidine compounds of the above type wherein R is a branched chain alkyl radical derived for example, from branched chain alkanols having from 9 to 18 carbon atoms obtained via the "Oxo" process by the high temperature, high pressure reaction of carbon monoxide, hydrogen, and branched chain olefins such as propylene trimer, propylene tetramer, butylene trimer, etc., as described for example in U.S. Patents 2,820,067, issued Jan. 24, 1958, and 2,638,487, issued May 12, 1953, examples of which compounds are 2-amino-4-(oxo-decyl-amino)-6-butylpyrimidine, 2-amino-4 - (oxo - hexadecyl-aminopyrimidine) and 2-amino-4-(oxo-nonadecylamino)-6-methylpyrimidine.

Aminopyrimidine compounds of the above formula having aliphatic hydrocarbyl radicals containing olefinic unsaturation are e.g. the normal and branched chain alkenyl cycloalkenyl- and alkadienylamino-substituted aminopyrimidines. Examples of such compounds are 2-amino-4-(3-hexenylamino)-6-methylpyrimidine, 2-amino-4-(2-decenylamino)-6-amylpyrimidine, 2-amino-4-(3-dodecenylamino)pyrimidine, 2-amino-4-(10-tetradecenyl-amino) - 6 - ethylpyrimidine, and 2-amino - 4 - (3-cyclohexenylamino)-6-methylpyrimidine. Also active are mixtures of compounds of the above type wherein R is an octadecenyl radical or an octadecadienyl radical, said mixtures being prepared by using amines derived from the unsaturated fatty acid fraction from tall oil distillation (normally consisting primarily of about equal portions of oleic and linoleic acid).

These virus growth-inhibiting pyrimidine compounds can be applied to the plant in a number of different ways, but it is preferred to apply them by spraying the plant foliage with a composition containing the active pyrimidine compound in at least a sufficient concentration to inhibit virus growth in the plant. The composition containing the active pyrimidine compound may comprise a water solution of or a water-in-oil emulsion of the active pyrimidine compound. Any appropriate dispersing agent compatible with water and the active pyrimidine compound so as to keep the pyrimidine compound in solution may be used. The composition may also comprise an oil-in-water emulsion of the active pyrimidine compound, which composition will ordinarily have an emulsifying agent incorporated therein to keep the active pyrimidine compound in the dispersed phase.

The anti-viral pyrimidine compounds used in this invention can also be applied to the plants by dipping the plant in a solution or dispersion of the compound in the case of potted plants, dusting the plant foliage with the active pyrimidine compound dispersed in an inert powder, or by other conventional means, e.g., systemically, i.e., where the chemical is applied indirectly to the plant by treating the soil near the plant whereby the chemical is absorbed by the plant through its root system. An additional method of applying the chemical would be by suspending small particles of the chemical in a stream of air or other gas, and spraying the plant with this suspension. The chemical can even be sprinkled on the plants in undiluted or powder form, if desired. In any event, the invention does not lie in the particular method of treating the plant.

The pyrimidine derivative compounds used in this invention are sufficiently soluble in water at the concentrations used herein to be applied to plants as virus growth inhibitors without the need of a dispersing agent. However, dispersing agents may be used to provide greater water solubility to the compound and to aid the penetration of the plant foliage by the virus inhibiting chemical. Also when one of these compounds or a salt thereof is applied to the plants as an oil-in-water emulsion, an emulsifying or dispersing agent may be required to keep the compound dissolved. Examples of emulsifying and dispersing agents which may be used are e.g., alkylbenzene-sulfonates, polyalkylene glycols, salts of sulfated long-chain alcohols, sorbitan fatty acid esters, etc. and other emulsifying agents which are listed, e.g., in the U.S. Department of Agriculture Bulletin, No. E607. The pyrimidine derivatives or salts thereof can also be applied dissolved or dispersed in organic solvents, e.g., liquid hydrocarbons, provided they are substantially non-phytotoxic to the plants. If applied admixed with an inert pulverulent carrier, such carriers as e.g., talc, bentonite, kieselguhr, diatomaceous earth, etc. can be used.

As stated above salts of these pyrimidine derivatives are also active as anti-viral agents, but the active portion is the compound itself and not the salt portion. The pyrimidine salts of the invention on contact with water hydrolyze releasing the pyrimidine compound which is the active constituent. The salt in some cases can have the advantage of getting the substituted pyrimidine compound into the plants more efficiently and so promoting the anti-virus action.

The following examples illustrate how the compounds used in this invention can be prepared.

EXAMPLE 1

A mixture of 28.8 g. (0.2 mole) of 2 - amino - 4-chloromethylpyrimidine and 37.0 g. (0.2 mole) of dodecylamine was heated at 195–205° C. for 15 hours, cooled to 100° C., treated with 50 ml. of butanol and cooled to 30° C. While stirring, there was fed in a solution of 8 g. of 50% plant lye (NaOH) in 20 ml. of water. Then 100 ml. of benzene and 10 g. of sodium chloride was added and the benzene layer was separated and distilled. The product, 2-amino-4-dodecylamino-6-methylpyrimidine, which had a boiling point of 240–250° C./10 mm. was obtained as a viscous yellow oil that solidified to a hard mass on standing; yield 34.6 g. (59.3%).

A yield of 88% was obtained by the addition of a small amount of conc. HCl to the reaction mixture.

*Analysis.*—Calcd. for $C_{17}H_{32}N_4$: N, 14.3. Found: N, 14.95.

EXAMPLE 2

Decylamine, 32.6 g. (0.2 mole), was stirred while 0.8 g. of dry HCl gas was added thereto. Then 28.8 g. of 2-amino-4-chloro-6-methylpyrimidine (0.2 mole) was added and the mixture heated to 195° C. where a vigorous reaction took place and the temperature rose to 250° C. The mixture was heated at 195°–200° C. for 2 hours, and cooled to 100° C., where 100 ml. of butanol was added and the mixture cooled to 30° C. While stirring 16.8 g. of 50% plant lye in 40 ml. of water was added, followed by 200 ml. of benzene and 200 g. of sodium chloride. After stirring the mixture one-half hour the benzene layer was removed, the solvent removed, and the product, 2-amino-4-decylamino-6-methylpyrimidine, distilled, B.P. 190°–191° C./1 mm. as a viscous yellow oil that solidified on standing, M.P. 74–77° C. The yield was 47.6 g. (89.8%).

*Analysis.*—Calcd. for $C_{15}H_{29}N_4$: N, 21.11. Found: N, 21.05.

EXAMPLE 3

With stirring, 0.7 g. of dry HCl gas was passed into 27 g. of 2-ethylhexylamine (0.2 mole) and then 28.7 g. of 2-amino-4-chloro-6-methylpyrimidine (0.2 mole). The mixture was heated to 170° C., where a vigorous reaction took place that carried the temperature to 240° C. The batch was heated to 195–205° C. for two hours, cooled to 100° C., where 100 ml. of butanol was added, and the mixture cooled to 30° C. Then 17.6 g. of 50% plant lye in 50 ml. of water was added, followed by 200 ml. of benzene and 10 g. of sodium chloride. After stirring for one-half hour, the benzene and butanol layer was separated, the solvents removed, and the product, 2-amino - 4 - (2 - ethylhexylamino) - 6 - methylpyrimidine distilled, B.P. 151–157° C./1 mm, which condensed as a viscous yellow oil and solidified on cooling.

*Analysis.*—Calcd. for $C_{15}H_{24}N_2$: N, 23.72. Found: 23.45.

EXAMPLE 4

Example 3 was repeated except that an equimolar quantity of 3-tridecenylamine was used in place of 2-ethylhexylamine. There was obtained as product, 2-amino - 4 - tridecenylamino - 6 - methylpyrimidine. The virus-growth inhibiting effect of the above described pyrimidine derivatives as compared to the effect by other aminopyrimidine compounds is illustrated as follows:

In experiments run substantially according to the method of Commoner et al., Arch. Biochem. Biophy., 27, 271 (1950), tests were conducted showing the inhibiting effects of the chemicals against the multiplication of tobacco mosaic virus. Briefly the procedure involves inoculation of a young leaf of a healthy Turkish tobacco plant with the virus and, after 24 hours, contacting portions of the inoculated leaf with the test compound. Leaves were inoculated with Johnson tobacco virus by rubbing their entire surface with a gauze pad moistened with a phosphate buffer solution (pH 7.0) containing 200 μg. of the virus per milliliter. After inoculation the leaves were placed under a bell-jar with their petioles in water for 24 hours. At the end of this time, six 0.5″ discs were punched from each leaf, weighed, washed in water and the discs of each leaf placed in different 3.5″ Petri dishes each containing a different test chemical in the desired concentration for testing in 15 ml. of half-strength Vickery's solution (Vickery et al., Bull. Conn. Agr. Expt. Sta., 399; 1937), which had been prepared to have a final concentration of $5 \times 10^{-3}$ mole of $KH_2PO_4$. A "control" was prepared for each leaf by placing another set of six discs from the leaf into a Petri dish containing 15 ml. of the same Vickery's solution but no test chemical. The dishes of discs were incubated for seven days under fluorescent light of 170 foot candles. At the end of that time the discs were removed and two groups of three were made up from each dish in order to provide "checks." The tobacco mosaic virus content of each group was determined as described by Commoner et al. (loc. cit.) except that the final washing step thereof was omitted because it had been previously observed by us that this step in the isolation procedure results in some loss of virus. The colorimetric measurements were made at 750 mu in a Coleman Universal spectrophotometer and the amount of virus was read from a standard curve prepared with known amounts of tobacco mosaic virus.

The results of these tests employing the procedure testing the inhibition of virus growth are reported in Table I below.

*Table I*

INHIBITION OF TOBACCO MOSAIC VIRUS MULTIPLICATION IN LEAF DISCS

| Compound | Molar Concentration | Percent Inhibition |
|---|---|---|
| A. 2-amino-4-decylamino-6-methylpyrimidine | $1 \times 10^{-3}$ | 100 |
|  | $1 \times 10^{-4}$ | 81.5 |
|  | $5 \times 10^{-5}$ | 54.5 |
| B. 2-amino-4-dodecylamino-6-methylpyrimidine | $1 \times 10^{-3}$ | 69 |
|  | $5 \times 10^{-4}$ | 49 |
|  | $2.5 \times 10^{-4}$ | 88 |
|  | $10^{-5}$ | 82 |
| C. 2,5-diamino-4,6-pyrimidinethione | $1 \times 10^{-3}$ | 0 |
| D. 2-amino-4,6-pyrimidinedione | $1 \times 10^{-3}$ | 0 |

Since inoculation of the leaf precedes the treatment by 18–20 hours, this test is a measure of the ability of a compound to inhibit tobacco mosaic virus (TMV) multiplication after the virus has become established in the host tissue.

Although the invention has been described in terms of specified examples in considerable detail, it should be understood that this is by illustration only and that the invention is not necessarily limited thereto. Particularly it should be recognized that the use of the indicated compounds and salts thereof are equivalent since a salt on contact with water will hydrolyze releasing the compound itself, which is the active antiviral agent. Accordingly, modifications are contemplated which can be made without departing from the spirit of the described invention.

What is claimed is:
1. The method of inhibiting the multiplication of plant viruses comprising applying to living plants a virus growth-inhibiting quantity of a compound selected from the group consisting of a pyrimidine compound of the formula

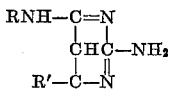

wherein R is a radical selected from the group consisting of saturated aliphatic hydrocarbyl radicals having from 6 to 20 carbon atoms, and aliphatic hydrocarbyl radicals containing olefinic unsaturation and having from 6 to 20 carbon atoms, R' is selected from the group consisting of hydrogen and lower alkyl radicals having from 1 to 6 carbon atoms.

2. The method of claim 1 wherein said plants are tobacco plants and the virus is tobacco mosaic virus.
3. The method of claim 1 wherein said pyrimidine compound is 2-amino-4-decylamino-6-methylpyrimidine.
4. The method of claim 1 wherein the pyrimidine compound is 2-amino-4-dodecylamino-6-methylpyrimidine.
5. The method of claim 1 wherein the pyrimidine compound is 2-amino-4-(2-ethylhexylamino)-6-methylpyrimidine.
6. A plant virus growth-inhibiting composition comprising an emulsifiable concentrate of a surface active agent and a compound of the formula

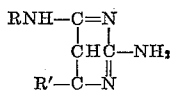

wherein R is a radical selected from the group consisting of saturated aliphatic hydrocarbyl radicals having from 6 to 20 carbon atoms, and aliphatic hydrocarbyl radicals containing olefinic unsaturation and having from 6 to 20 carbon atoms, and R' is selected from the group consisting of hydrogen and lower alkyl radicals having from 1 to 6 carbon atoms.

References Cited in the file of this patent

UNITED STATES PATENTS

| | | |
|---|---|---|
| 2,638,487 | Russum et al. | May 12, 1953 |
| 2,820,067 | Mertzweiller et al. | Jan. 14, 1958 |

OTHER REFERENCES

Fraenkel-Conrat: Infectivity of Tobacco Mosaic Virus Nucleic Acid, in New York Academy of Sciences, V. G. Allfrey, et al., Cellular Biology, Nucleic Acids and Viruses, Consulting Editor, T. M. Rivers, 414 pp., N.Y., The Academy, 1957, special publications, vol. 5, pp. 219–227.

Homers-Casterman et al.: Virology, vol. 3, pp. 197–206, 1957.

Wheeler et al.: Proc. Soc. for Expt'l Biol. and Med., vol. 92, pp. 396–399, 1956, PSEBM #22,490.